(12) United States Patent
Gupta et al.

(10) Patent No.: US 8,590,023 B2
(45) Date of Patent: Nov. 19, 2013

(54) MOBILE DEVICE AND METHOD FOR AUTOMATIC CONNECTIVITY, DATA OFFLOADING AND ROAMING BETWEEN NETWORKS

(75) Inventors: Vivek Gupta, San Jose, CA (US); Necati Canpolat, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 31 days.

(21) Appl. No.: 13/173,338

(22) Filed: Jun. 30, 2011

(65) Prior Publication Data

US 2013/0007853 A1    Jan. 3, 2013

(51) Int. Cl.
*H04L 29/06* (2006.01)
*G06F 7/04* (2006.01)
*G06F 15/16* (2006.01)
*G06F 17/30* (2006.01)

(52) U.S. Cl.
USPC ............... 726/5; 370/329; 370/331; 370/338

(58) Field of Classification Search
USPC ......................................... 370/329, 338, 331
See application file for complete search history.

(56) References Cited

U.S. PATENT DOCUMENTS

| | | | |
|---|---|---|---|
| 7,944,901 B2 * | 5/2011 | Souissi et al. | 370/338 |
| 2010/0290424 A1 * | 11/2010 | Collingrige | 370/329 |
| 2011/0007705 A1 * | 1/2011 | Buddhikot et al. | 370/331 |

* cited by examiner

*Primary Examiner* — Shin-Hon Chen
(74) *Attorney, Agent, or Firm* — Schwegman, Lundberg & Woessner, P.A.

(57) ABSTRACT

Embodiments of a mobile device and methods automatically connecting to a Wi-Fi Hotspot 2.0 are generally described herein. In some embodiments, subscription information for one or more service providers (SP) that operate Wi-Fi networks is stored in a subscription data object of the mobile device. The subscription information includes home service provider information, policy information and pre-provisioned credentials. The mobile device may be configured to determine, without user interaction, if the subscription information is applicable to an available Wi-Fi network and perform without user interaction, an extensible authentication protocol (EAP) based authentication using the pre-provisioned credentials with the available Wi-Fi network to establish a Wi-Fi connection with the available Wi-Fi network. This automatic connectivity may allow a mobile device to roam across Wi-Fi hotspots of Wi-Fi networks and offload traffic to Wi-Fi networks.

25 Claims, 5 Drawing Sheets

| | ATTRIBUTE | CURRENT NETWORKS (Wi-Fi + 2G/TD-SCDMA) | NETWORKS IN 2012 AND BEYOND (Wi-Fi + 2G/TD-LTE) |
|---|---|---|---|
| SINGLE-MODE DEVICES (Wi-Fi ONLY DEVICES) (E.G. LAPTOPS, NETBOOKS, iPAD, iPOD, Wi-Fi PHONE, ETC.) | CREDENTIALS | USERNAME/PASSWORD | CERTIFICATES |
| | AUTHENTICATION METHODS | WEBAUTH WITH WISPr 1.0 | 802.1X, EAP TTLS |
| | PROVISIONING | BROWSER HIJACK, UAM | SECURE ONLINE SIGNUP |
| | ROAMING | HOME SERVICE PROVIDER HOT SPOTS OR SINGLE SIGN ON CLIENT | WITH ALL SERVICE PROVIDERS |
| | CONNECTIVITY | MANUAL | AUTOMATIC |
| DUAL-MODE DEVICES (Wi-Fi AND CELLULAR DEVICES) (LAPTOPS, NETBOOKS, DONGLE, iPAD, iPHONE, ETC.) | CREDENTIALS | SEPARATE CREDENTIALS USERNAME/PASSWORD FOR Wi-Fi | COMMON CREDENTIALS. (SIM/UICC) |
| | AUTHENTICATION METHODS | WEBAUTH WITH WISPr 1.0 | EAP-AKA |
| | PROVISIONING | BROWSER HIJACK, UAM | PRE-PROVISIONED |
| | ROAMING | HOME SERVICE PROVIDER HOTSPOTS ONLY | ALL Wi-Fi/3GPP SERVICE PROVIDERS |
| | CONNECTIVITY | MANUAL | AUTOMATIC |

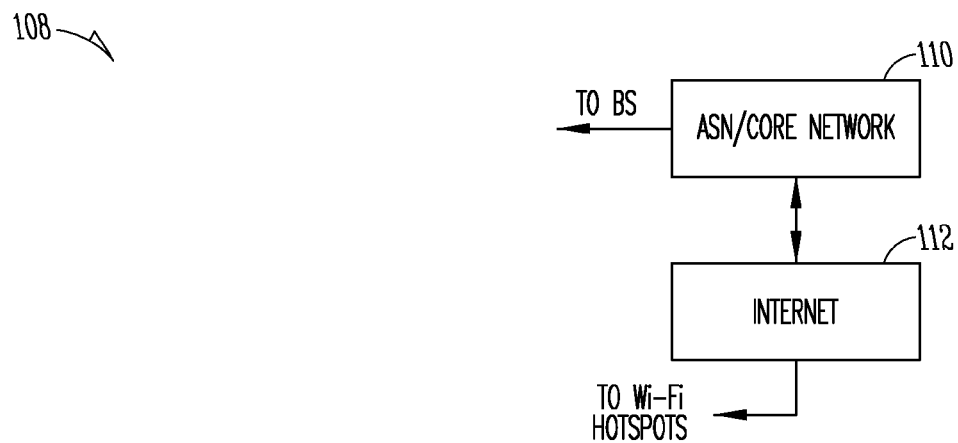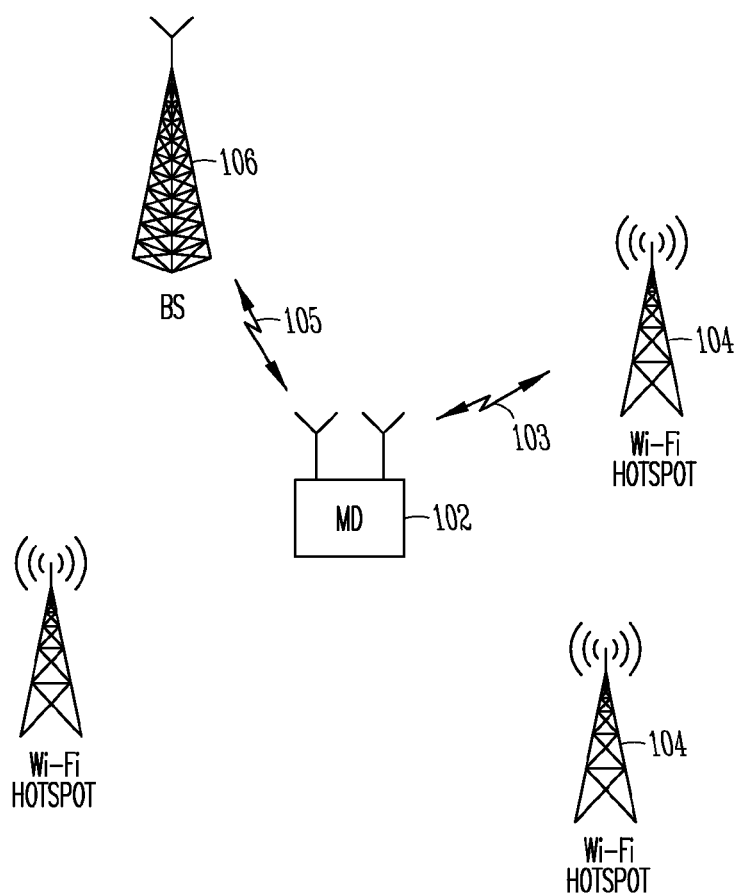
FIG. 1

SUBSCRIPTION DATA OBJECT

FIG. 3A

| CREDENTIAL TYPE | EAP METHOD |
|---|---|
| CERTIFICATE | EAP-TLS |
| SIM/USIM | EAP-AKA, EAP-SIM |
| USERNAME/PASSWORD (WITH SERVER SIDE CERTIFICATES) | EAP-TTLS OR EAP-FAST |

FIG. 3B

| | ATTRIBUTE | CURRENT NETWORKS (Wi-Fi + 2G/TD-SCDMA) | NETWORKS IN 2012 AND BEYOND (Wi-Fi + 2G/TD-LTE) |
|---|---|---|---|
| SINGLE-MODE DEVICES (Wi-Fi ONLY DEVICES) (E.G. LAPTOPS, NETBOOKS, iPAD, iPOD, Wi-Fi PHONE, ETC.) | CREDENTIALS | USERNAME/PASSWORD | CERTIFICATES |
| | AUTHENTICATION METHODS | WEBAUTH WITH WISPr 1.0 | 802.1X, EAP TLS |
| | PROVISIONING | BROWSER HIJACK, UAM | SECURE ONLINE SIGNUP |
| | ROAMING | HOME SERVICE PROVIDER HOT SPOTS OR SINGLE SIGN ON CLIENT | WITH ALL SERVICE PROVIDERS |
| | CONNECTIVITY | MANUAL | AUTOMATIC |
| DUAL-MODE DEVICES (Wi-Fi AND CELLULAR DEVICES) (LAPTOPS, NETBOOKS, DONGLE, iPAD, iPHONE, ETC.) | CREDENTIALS | SEPARATE CREDENTIALS USERNAME/PASSWORD FOR Wi-Fi | COMMON CREDENTIALS. (SIM/UICC) |
| | AUTHENTICATION METHODS | WEBAUTH WITH WISPr 1.0 | EAP-AKA |
| | PROVISIONING | BROWSER HIJACK, UAM | PRE-PROVISIONED |
| | ROAMING | HOME SERVICE PROVIDER HOTSPOTS ONLY | ALL Wi-Fi/3GPP SERVICE PROVIDERS |
| | CONNECTIVITY | MANUAL | AUTOMATIC |

MOBILE DEVICE AND METHOD FOR AUTOMATIC CONNECTIVITY, DATA OFFLOADING AND ROAMING BETWEEN NETWORKS

TECHNICAL FIELD

Embodiments pertain to wireless communications. Some embodiments relate to automatic connectivity to wireless fidelity (Wi-Fi) networks and roaming across Wi-Fi networks. Some embodiments relate to Hotspot 2.0 networks and the Hotspot 2.0 evolution. Some embodiments relate to roaming between cellular and Wi-Fi networks. Some embodiments relate to offloading traffic from cellular networks to Wi-Fi networks.

BACKGROUND

One issue with connecting to Wi-Fi networks is that it is not a simple and user-friendly process. A user of a mobile device generally needs to discover nearby access points, manually surf through a variety of different service set identifiers (SSIDs) identifying the Wi-Fi networks, select one of the networks, and enter credentials. In many cases, the user must go through several cumbersome web pages, among other things, to select, associate and authenticate with a Wi-Fi network. As the user changes location, the user must go through this process again to connect to another Wi-Fi network. This is unlike cellular networks in which mobile devices automatically connect to and handoff communications across base stations operated by the same service provider as well as connect to and roam across base stations operated by different service providers.

Mobile data usage is growing exponentially and causing capacity and network congestion issues on cellular networks. Thus, cellular operators are facing challenges to meet the increasing demand while keeping their operating expenses (OPEX) and capital expenditures (CAPEX) low. This increasing demand continues to exceed the ability of cellular networks satisfy the demand even with the deployment of broadband access cellular networks such as third-generation high-speed packet access (3G HSPA), fourth generation long-term evolution (4G LTE) networks and wireless microwave access (WiMAX) networks. Many Wi-Fi networks, on the other hand, have a very high capacity at very low cost price point.

Thus, there are general needs for improved methods to enable mobile devices to connect Wi-Fi networks automatically with no user intervention, as well as general needs for mobile devices and methods for roaming between Wi-Fi hotspots. There are also general needs for mobile devices and improved methods for roaming among Wi-Fi networks and cellular networks. There are also general needs for mobile devices and improved methods for offloading traffic from cellular networks to Wi-Fi networks.

BRIEF DESCRIPTION OF THE DRAWINGS

FIG. 1 illustrates a wireless operating environment in accordance with some embodiments;

FIG. 3A is a table showing example credential types in accordance with some embodiments;

FIG. 3B is a table showing some example options for traffic offloading in accordance with some embodiments.

DETAILED DESCRIPTION

Figure 2A:
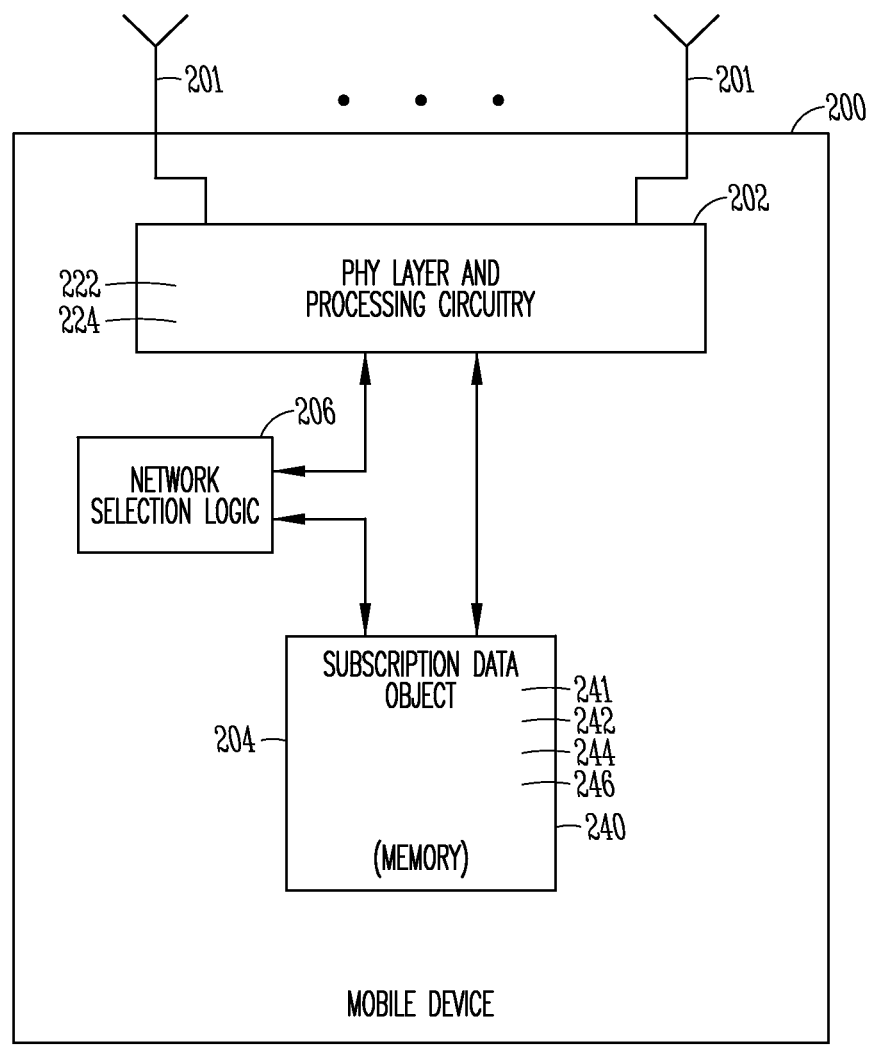
FIG. 2A is a block diagram of a mobile device in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

FIG. 1 illustrates a wireless operating environment in accordance with some embodiments. The wireless operating environment may include a mobile device (MD) 102, a plurality of Wi-Fi hotspots 104 (i.e., Wi-Fi access networks), and one or more base stations, such as base station 106. In the example illustrated in FIG. 1, base station 106 may provide cellular network communication services with a geographic region of cell 108. As illustrated, the plurality of Wi-Fi hotspots 104 may operate within the cell 108. Each of the Wi-Fi hotspots 104 may be operated by a Wi-Fi service provider (SP) and may allow the mobile device 102 to connect to a network such as the Internet 112 and/or route voice and data communications to other networks including cellular networks, such as access service network (ASN) 110. One Wi-Fi hotspot 104 may be associated with a first Wi-Fi network operated by a first service provider while another Wi-Fi hotspot 104 may be associated with a second Wi-Fi network operated by a second service provider. In some embodiments, one Wi-Fi hotspot 104 may be shared by multiple service providers in which the Wi-Fi hotspot 104 is associated with more than one SSID. In these situations, one SSID, for example, may be assigned to each of the service provider. If mobile device 102 is a dual mode device, cellular type communication services of access service network 110 may be provided through a set of base stations, such as base station 106.

In accordance with embodiments, the mobile device 102 may be configured for automatically discovering and connecting to Wi-Fi hotspots 104. The mobile device 102 may also be configured to roam across Wi-Fi hotspots 104. In dual-mode embodiments, the mobile device may also be configured to offload traffic from the cellular network to the available Wi-Fi networks. These embodiments are discussed in more detail below.

In accordance with some embodiments, the mobile device 102 may include subscription information stored therein for one or more service providers that operate Wi-Fi networks. The subscription information may be stored in a subscription data object. The subscription information may include home service provider information, policy information and pre-provisioned credentials. In these embodiments, the mobile device 102 may be configured to determine, without user interaction, if the subscription information is applicable to an available Wi-Fi network. When the subscription information is applicable to an available Wi-Fi network, the mobile device 102 may be configured to perform, without user interaction, an authentication protocol, such as an extensible authentication protocol (EAP) based authentication, using the pre-provisioned credentials with the available Wi-Fi network to establish a Wi-Fi connection 103 with the available Wi-Fi network.

In some embodiments, the Wi-Fi hotspot 104 may be a Wi-Fi Hotspot 2.0 operating in accordance with a Hotspot 2.0 evolution specification, such as the Hotspot 2.0 evolution specification of the Wi-Fi Alliance. The mobile device 102 may be a Hotspot 2.0 enabled device and the subscription information may include pre-provisioned subscription information for automatic connection to a Wi-Fi Hotspot 2.0. A Wi-Fi network may be a wireless network including a Wi-Fi hotspot configured to operate in accordance with one of the IEEE 802.11 standards for wireless local area networks (WLANs). A Wi-Fi network uses a carrier-sense multiple access technique with collision avoidance (CSMA/CA) in which upstream and downstream communications use the same frequency channels. Cellular networks, on the other hand, such as 4G LTE networks and WiMAX networks, implement an OFDMA technique. 3G cellular networks may use a CDMA technique.

In these embodiments, a Wi-Fi network may be discovered in a pre-associated state and may provide a cellular-like experience that allows automatic, secure, easy and simplified connectivity for Wi-Fi hotspot subscribers. This is unlike current solutions for Wi-Fi hotspot connectivity, which are proprietary and based on accessing different web pages (e.g., landing pages) requiring user intervention for initiating connections.

Embodiments described herein provide mechanisms that simplify Wi-Fi hotspot discovery, selection, automatic connectivity and session renewal. In some embodiments described in more detail below, a Wi-Fi hotspot 104 may be configured to provide additional information to assist in network discovery and to aid the network selection process based on user configuration and service provider policy settings. Although a connection to a Wi-Fi network can be established manually by the user, in accordance with embodiments, a Wi-Fi network connection may be established automatically based on triggers generated by mechanisms such as location assistance from the network. This may enhance power optimization, among other things. In case of automatic connection establishment, a user will not need to re-enter credentials. These embodiments are discussed in more detail below.

FIG. 2A is a block diagram of a mobile device in accordance with some embodiments. Mobile device 200 may be suitable for use as mobile device 102 (FIG. 1). Mobile device 200 may include physical (PHY) layer and processing circuitry 202, memory 204, and network discovery and selection logic 206, among other things. Physical layer and processing circuitry 202 may be configured for communicating with one or more wireless networks. In the case of a single-mode mobile device, the physical layer and processing circuitry 202 may be configured for communicating with Wi-Fi network.

In the case of a dual-mode mobile device, the physical layer and processing circuitry 202 may be configured for communicating with both a cellular network and a Wi-Fi network. In dual-mode embodiments, the mobile device 200 may include both a Wi-Fi transceiver 222 and one or more cellular network transceivers 224.

In accordance with embodiments, the memory 204 may store one or more subscription data objects such as subscription data object 240. The subscription data object 240 may store subscription information 241 for one or more service providers that operate Wi-Fi networks. The subscription information 241 may include home service provider information 242, policy information 244 and pre-provisioned credentials 246, among other things.

The network discovery and selection logic 206 may be configured to determine without user interaction, if the subscription information 241 is applicable to an available Wi-Fi network. The network selection logic 206 may also be configured to perform, without user interaction, an EAP-based authentication using the pre-provisioned credentials 246 with an available Wi-Fi network to establish a Wi-Fi connection 103 (FIG. 1) with the available Wi-Fi network.

In accordance with some embodiments, the home service provider information 242 identifies a home service provider. The home service provider may be the service provider that a user of the mobile device 200 has a subscription agreement with and for which credentials are pre-provisioned. In these embodiments, the mobile device 200 may be configured to determine, based on the home service provider information 242 and the policy information 244, whether the user of the mobile device 200 has a subscription agreement with a service provider of an available Wi-Fi network (i.e., whether the available Wi-Fi network is operated by the home service provider), or whether the home service provider has a roaming agreement with the available Wi-Fi network when the service provider of the available Wi-Fi network is not the home service provider. In this way, automatic connectivity may be achieved with Wi-Fi hotspots 104 operated by the home service provider as well as with Wi-Fi hotspots 104 operated by roaming partners of the home service provider.

The following abbreviations may be used herein: Evolved Universal Terrestrial Radio Access Network (E-UTRAN), Long-Term Evolution (LTE), 3rd Generation Partnership Project (3GPP), Worldwide Interoperability for Microwave Access (WiMAX), Wireless Local Area Network (WLAN), Orthogonal Frequency Division Multiplexed (OFDM), Orthogonal Frequency Division Multiple Access (OFDMA), Code Division Multiple Access (CDMA), Multiple-Input Multiple Output (MIMO), Multi-User MIMO (MU-MIMO), Single-User MIMO (SU-MIMO), Radio-Access Technology (RAT), Radio-Access Network (RAN), Wireless Fidelity (Wi-Fi), Institute of Electrical and Electronics Engineers (IEEE).

The cellular transceiver 224 may be a 3G CDMA transceiver including a 3G high-speed packet access (HSPA) or GSM/GPRS transceiver, a 4G LTE OFDMA transceiver, or a WiMAX OFDMA transceiver, although the scope of the embodiments is not limited in this respect. The Wi-Fi transceiver 222 may be an OFDM or direct sequence spread spectrum (DSS) transceiver configured to implement any of the IEEE 802.11 standards for WLANs and may have Hotspot 2.0 capability.

The mobile device 200 may also include one or more antennas 201. The antennas 201 may be internal to mobile device 200. Antennas 201 may comprise one or more directional or omnidirectional antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas 201 may be effectively separated to take advantage of spatial diversity and the different channel characteristics that may result between each of antennas 201 and the antennas of a transmitting station.

Figure 2B:
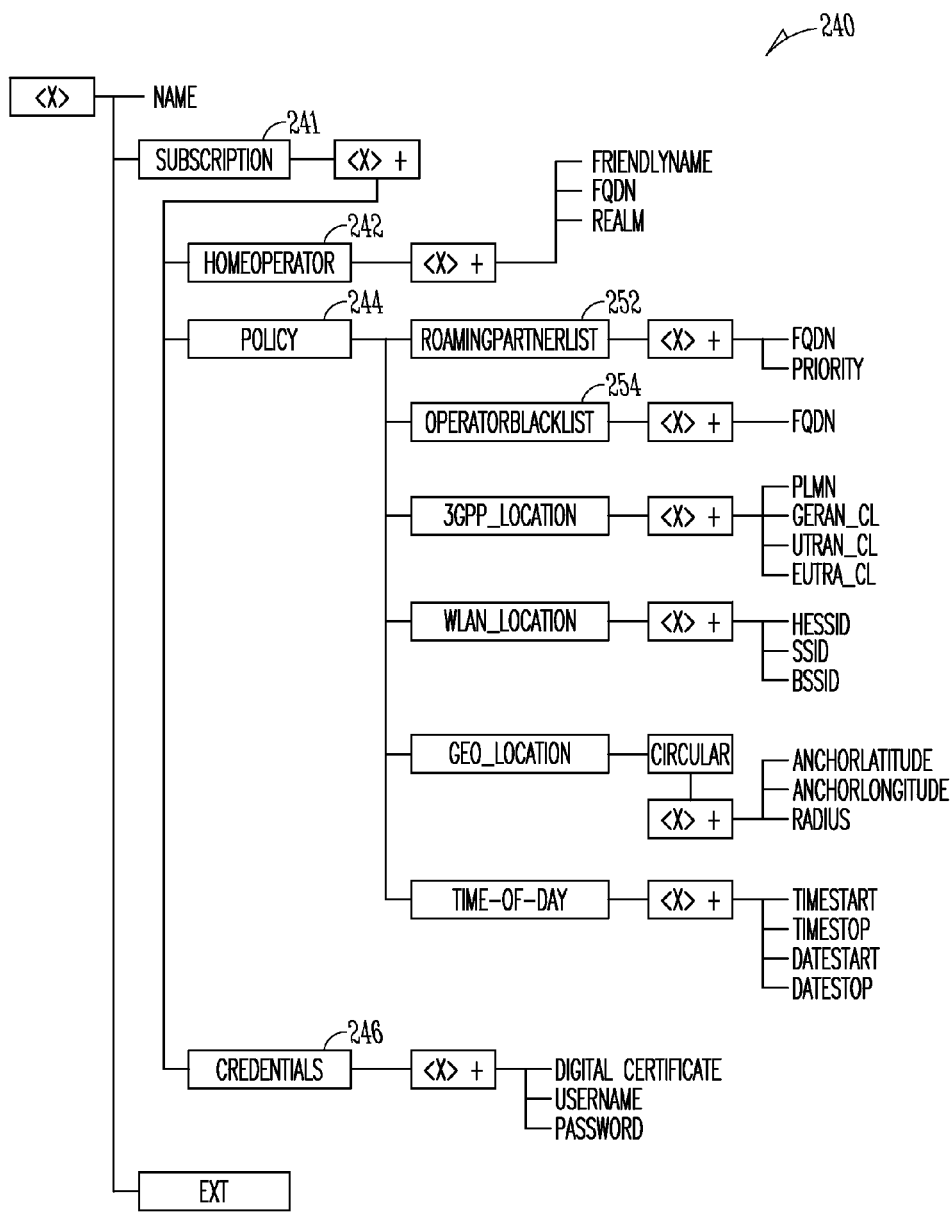
FIG. 2B illustrates a subscription data object in accordance with some embodiments.

FIG. 2B illustrates the data structure of a subscription data object in accordance with some embodiments. As discussed above, the subscription data object 240 includes the subscription information 241, which may include the home service provider information 242, the policy information 244 and the pre-provisioned credentials 246 for a subscription with a home service provider of one or more Wi-Fi networks.

In some embodiments, when the user of the mobile device 200 has a subscription agreement with more than one service provider, the subscription data object 240 may include subscription information 241 for each service provider. In some other embodiments, when the user of the mobile device 200 has a subscription agreement with more than one service provider, a separate subscription data object 240 (i.e., multiple instances of the subscription data object 240) may be included for each service provider. In these embodiments, subscription information 241, home service provider information 242, policy information 244 and pre-provisioned credentials 246 may be included for each service providers.

The home service provider information 242 may identify a friendly name and a fully-qualified domain name (FQDN). The home service provider information 242 may also identify a service provider network access identifier (NAI) realm for the home service provider.

The policy information 244 includes a roaming partner list 252 indicating the hotspot service providers, if any, that the home service provider has a roaming agreement with. In these embodiments, when the policy information 244 indicates that the hotspot service provider of an available Wi-Fi network is on the roaming partner list 252, the mobile device 200 may use its pre-provisioned credentials 246 to establish a Wi-Fi connection 103 with the available Wi-Fi network without any user intervention (i.e., automatically).

For each hotspot service provider on the roaming partner list 252, the subscription data object 240 may include a FQDN and priority information. The priority information may be used by the mobile device 200 when selecting (e.g., to prioritize) between more than one available Wi-Fi network operated by service providers on the roaming partner list. The selection between available Wi-Fi networks may be based on connection information (i.e., QoS level, bandwidth, etc.).

The policy information 244 may also include a service provider blacklist 254 which may indicate the Wi-Fi network service providers or Wi-Fi hotspot service providers with which the home service provider does not have a roaming agreement. The service provider blacklist 254 identifies the FQDN for each blacklisted hotspot service provider. In accordance with embodiments, the mobile device 200 may be configured to refrain from establishing a Wi-Fi connection with hotspot service providers identified in the service provider blacklist 254. The service provider blacklist 254 may be a revocation list of service providers for the home service provider for which the home service provider does not wish to establish any connections.

In accordance with some embodiments, the mobile device 200 may be configured to roam from a Wi-Fi hotspot 104 of a currently connected Wi-Fi network to a hotspot of another Wi-Fi network serviced by either the home service provider or a hotspot service provider on the roaming partner list 252. In these embodiments, the mobile device may refrain from roaming to a hotspot operated by a service provider on the service provider blacklist 254.

In some embodiments, the policy information 244 may also include policy parameters that indicate one or more of locations, dates and times for which certain subscription information 241 is valid or applicable. The location information may be expressed in geo-location coordinates, expressed using cellular identifiers, or expressed using WLAN location identifiers. In some embodiments, the geo-location coordinates may include an anchor latitude and longitude along with a radius to indicate a region within which the policy is valid. In some embodiments, dates and times may be included to indicate start and stop dates/times for which a policy is valid.

The cellular identifier may be cellular or cell identifier (CI) received from a base station (BS) 106 of a cellular network. The WLAN identifier may be a basic-service set identifier (BSSID), a service-set identifier (SSID), or a Homogeneous Extended Service Set Identifier (HESSID) that may be received from a Wi-Fi hotspot 104.

In some embodiments, the pre-provisioned credentials 246 may be unified credentials suitable for EAP-based authentication. In these embodiments, the use of unified credentials may allow a user to connect automatically across different Wi-Fi hotspots that have roaming agreements between cellular network service providers. This allows for cellular network service providers to offload mobile traffic, particular high-bandwidth data traffic, from cellular or other networks onto a Wi-Fi network for dual mode devices (i.e., device with both cellular network capability and Wi-Fi network capability). The use of the common or unified credentials across both cellular and Wi-Fi networks and the unified authentication mechanisms of these embodiments facilitate this offloading as well as roaming.

In some embodiments, the pre-provisioned credentials 246 may be certificate-based credentials that may comprise a digital certificate for EAP-TLS (transport-layer security) authentication. The use of certificate-based credentials and EAP-based authentication mechanisms as described herein may adequately secure the Wi-Fi hotspots and may help prevent the Wi-Fi networks from various attacks.

When the mobile device 200 is a single-mode device (with Wi-Fi network capability but without cellular-network capability), the digital certificate of the pre-provisioned credentials 246 may be an X.509 configured certificate that is based on public/private key pair (i.e., asymmetric keys). In these embodiments, an X.509 certificate may be configured in accordance with the X.509 ITU-T standard for public key infrastructure (PKI) for single sign-on (SSO) and Privilege Management Infrastructure (PMI). A certification authority (CA) may issue the certificate which may bind a public key to a particular distinguished name in the X.500 tradition, or to an alternative name such as an e-mail address or a DNS-entry. Unlike conventional Wi-Fi networks, in these embodiments the use of X.509 certificates may be used as credentials. In accordance with some embodiments, single mode devices may use 802.1X and EAP based EAP-Tunneled Transport Layer Security (EAP-TTLS) authentication methods.

When the mobile device 200 is a dual-mode device (a device with both Wi-Fi network capability and cellular-network capability), the pre-provisioned credentials 246 may comprise a subscriber-identity module (SIM) (or a universal SIM (USIM)) for either EAP-Authentication and Key Agreement (EAP-AKA) authentication or EAP-Subscriber Identity Module (EAP-SIM) authentication. In accordance with these embodiments, dual-mode mobile devices may use common SIM/UICC based credentials for both Wi-Fi and cellular networks and may use common authentication methods (EAP-SIM/EAP-AKA) for both the Wi-Fi and cellular networks. In some embodiments, the SIM/USIM credentials may be used by UMTS enabled dual-mode mobile devices.

In some embodiments, the pre-provisioned credentials 246 may comprise a user name and password for use with server-side certificates. In these embodiments, either EAP-Tunneled Transport Layer Security (EAP-TTLS) or EAP-Flexible Authentication via Secure Tunneling (EAP-FAST) authentication may be used. Other EAP based authentication methods may also be suitable for use for connecting to, offloading and roaming between Wi-Fi networks.

The use of these common authentication methods enables, among other things, seamless roaming across cellular network and Wi-Fi networks leading to relatively seamless Wi-Fi offloading. These embodiments are discussed in more detail below.

FIG. 3A is a table showing example credential types in accordance with some embodiments. Table 300 shows EAP methods 304 for each of the credential types 302 that may be used by various mobile devices in accordance with embodiments disclosed herein.

FIG. 3B is a table shown some example options for traffic offloading in accordance with some embodiments. Table 350 shows current technical options 358 and technical options 360 in accordance with the embodiments disclosed herein for each attribute 356 for both single mode devices 352 and dual-mode devices 354.

In some embodiments, the mobile device 200 may select a hotspot 104 for initial connection r based on connection information such as a RSSI, available bandwidth, and/or QoS information or roaming agreements in cases involving roaming. In these embodiments, the mobile device 200 may select a Wi-Fi hotspot 104 based on the requirements of the applications running on the device. For example, connection to a hotspot 104 may be performed when the connection is determined to meet the QoS requirements of an application running on the device, and will not be performed when the connection does not meet the QoS requirements of an application running on the device.

In these embodiments, a mobile device 200 may be able to roam, not only across hotspots operated by different service providers (that have a roaming agreement with the home service provider), but across the various hotspots that may be operated by the home service provider. Furthermore, the mobile device 200 may be able to roam, not only across base stations operated by different cellular network service providers (that have a roaming agreement with a home service provider wireless network service provider), but across the various base stations that may be operated by the home service provider cellular network service provider. In some cases, the home service provider cellular network service provider (that operates cellular base stations) may be a home service provider that operates Wi-Fi networks.

During roaming, there may be both roaming outbound and roaming inbound users. For roaming users, the visited network may be configured to route the credentials to the home network and authenticate the user in the home network.

In some embodiments, single-mode (i.e., Wi-Fi) devices may be able to seamlessly roam across Wi-Fi networks operated by different Wi-Fi service providers based on standardized roaming agreements. Dual mode devices may be able to roam between Wi-Fi networks operated by Wi-Fi service providers, and roam between cellular networks operated by different cellular network service providers. In some embodiments, the subscription data object 241 may specify a list of service provider FQDNs with a priority level associated with each roaming partner.

In some embodiments, a mobile device 200 may be configured to roam from a Wi-Fi hotspot 104 of currently connected Wi-Fi network to a base station 106 of a cellular network using pre-provisioned credentials for the cellular network. In these embodiments, the currently connected Wi-Fi network may be providing both voice and data services to the mobile device 200 and both the voice and data services may be transferred from the currently connected Wi-Fi network to the cellular network. In these embodiments, the mobile device 200 may use X.509 based credentials, discussed below, although this is not a requirement. Accordingly, a mobile device 200 with pre-provisioned credentials may seamlessly roam between Wi-Fi and cellular networks without user interaction.

Figure 4:
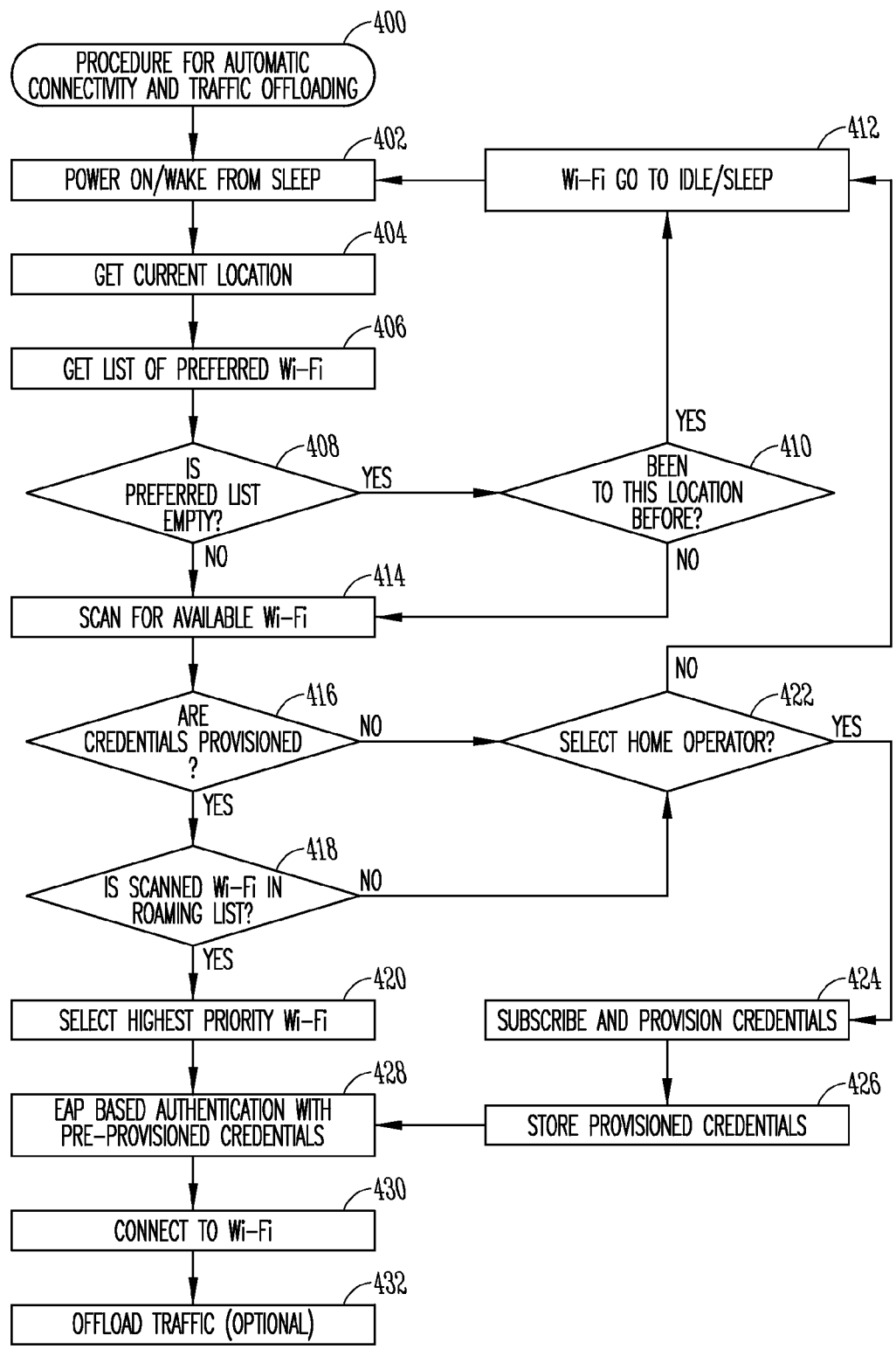
FIG. 4 is a flow chart of a procedure for automatic connectivity and traffic offloading in accordance with some embodiments.

FIG. 4 is a flow chart of a procedure for automatic connectivity and traffic offloading in accordance with some embodiments. Procedure 400 may be performed by a mobile device, such as mobile device 102 (FIG. 1).

In operation 402, the mobile device 102 may be powered on or may wake up from a low-power or idle state or sleep mode.

In operation 404, the mobile device may determine its current location. In some embodiments, the mobile device 102 may determine, without user interaction, its current location based on a geo-location (e.g., GPS), a cellular identifier (i.e., received from a base station 106) or a WLAN identifier (received from a Wi-Fi hotspot or Wi-Fi access point).

In operation 406, the mobile device 102 may identify any preferred Wi-Fi networks associated with Wi-Fi hotspots 104 at a current location of the mobile device 102. In some embodiments, the mobile device 102 retrieve without user interaction, a list of one or more preferred Wi-Fi networks available at the current location from the subscription data object 240. In these embodiments, the mobile device 102 may generate the list of preferred Wi-Fi networks available at different geographic locations that were visited by the mobile device 102. In this way, the amount of scanning for available Wi-Fi networks may be reduced, reducing power consumption.

In operation 408, the mobile device 102 may determine if there are any preferred Wi-Fi hotspots associated with the current location on the list. When there are preferred Wi-Fi hotspots on the list, operation 414 may be performed. When there are no preferred hotspots on the list, operation 410 may be performed.

In operation 410, the mobile device 102 may determine whether it has been to the current location before. In these embodiments, the mobile device 102 is configured to maintain a list of geographic locations that were visited by the mobile device 102 along with a time/date stamp to indicate when the current location was last visited. Operation 412 may be performed when it has been to the current location before. Operation 414 may be performed when it has not been to the current location before.

As part of operation 410, when the mobile device has been to the current location before, the mobile device may be configured to detect if there are any Wi-Fi network updates (i.e., since the preferred list is empty). In these embodiments, the mobile device may be configured to detect if there are any Wi-Fi network updates after a predetermined period time has passed based on the time/date stamp associated with the current location. The predetermine period of time as well as the option to detect for Wi-Fi network updates may be user-setting to allow these operations to be performed automatically. If the predetermined period of time has passed, the mobile device may be configured to perform scanning at the current location to determine if there are any available Wi-Fi networks to update the list of preferred Wi-Fi networks available the current location. If there is an available Wi-Fi network, the procedure may proceed directly to operation 416. If there are no available Wi-Fi network updates, the procedure may proceed directly to operation 412.

In operation 412, the mobile device 102 may be configured to go to sleep or enter an idle or low power state. In this situation, the mobile device has been to the current location before but since there were not preferred hotspots at that location, the mobile device 102 will refrain from attempting to automatically connect to any hotspots.

In operation 414, the mobile device 102 may scan for available Wi-Fi networks.

In operation 416, the mobile device may determine if it is pre-provisioned for automatic connectivity (i.e., has subscription information 241 in the subscription data object 240).

In some embodiments, the mobile device 102 may determine if credentials are pre-provisioned for Wi-Fi hotspot connectivity.

When the mobile device 102 determines that is not pre-provisioned for automatic connectivity, the mobile device 102 may be configured to perform a subscription provisioning process of operations 422, 424 and 426 to generate and store the pre-provisioned subscription information in the subscription data object 240. In this way, on-line provisioning may be performed. In these embodiments, the user may choose perform the subscription provisioning process.

The subscription information 241 may be stored in the mobile device 102 by downloading the subscription information 241 in accordance with either an open-mobile alliance (OMA) device management (DM) (OMA-DM) technique or a Simple Object Access Protocol (SOAP) Extensible Markup Language (XML) (SOAP-XML) technique.

In some embodiments, the subscription provisioning process includes connecting to a sign-up server in operation 422 and signing up for a subscription agreement with a Wi-Fi network service provider in operation 424, during which credentials may be provisioned. In these embodiments, the user may initially select a home service provider, may select a service plan based on for example, cost, access restrictions, data requirements, among other things. Accordingly, a user is able to securely sign-up on-line for a Wi-Fi service. Credentials and service provider policies are provisioned on the mobile device 102. Device management mechanisms such as OMA-DM allow certificates and other user credentials to be provisioned over the air. A secure signup mechanism based on SOAP-XML using HTTPS based transport allows the user to verify the authenticity of the online server before providing its own information and securely downloading the credentials. In some embodiments, the mobile device 102 may be required to provision public certificates to authenticate the root server from the service provider before initiating this process.

In operation 418, the mobile device may determine if it has subscription information 241 in the subscription data object 240 for any one or more of the available Wi-Fi networks, or if any of the available Wi-Fi networks are on the roaming partner list 252 (FIG. 2B). When the mobile device 102 determines that is not pre-provisioned for any of the available Wi-Fi networks in operation 418, the mobile device 102 may be configured to perform a subscription provisioning process of operations 422, 424 and 426.

In operation 420, when the mobile device is pre-provisioned for connectivity to more than one of the available Wi-Fi networks, the mobile device 120 may select a preferred (e.g., highest priority) of the available Wi-Fi networks based on priority information in the subscription data object 240.

In operation 428, the mobile device 102 may automatically perform, without user interaction, an EAP based authentication using the pre-provisioned credentials 246 with a selected one of the available Wi-Fi networks.

In operation 430, a Wi-Fi connection 103 (FIG. 1) may be established with the Wi-Fi hotspot. In some embodiments, the mobile device 102 may be configured to check if it is a dual-mode device. When it is a dual mode mobile device, operation 432 may be performed.

If the mobile device 102 is a dual-mode mobile device, operation 432 may include offloading traffic from a cellular network to the Wi-Fi network after the connection to the Wi-Fi network is established in operation 430. In some embodiments, traffic offloading may be based on load balancing or other criteria established by the cellular network and may be initiated by network service provider policies that are pre-configured on the mobile device 102. The user may also initiate offloading based on user preferences such as better service, QoS or specific services that may be available on some Wi-Fi networks. User preferences for offloading may be stored with the user profiles on the device. For example, the user of the mobile device may configure the device for traffic offloading for higher-bandwidth operations (e.g., downloading or uploading information, video streaming, etc.), and may configured to device to refrain from traffic offloading for lower-bandwidth operations such as SMS (short-messing services such as texting) and voice communications.

Although mobile device 200 (FIG. 2) is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of the mobile device 200 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the mobile device 200 may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method of automatically connecting a mobile device to a Wi-Fi hotspot, the method comprising:

storing subscription information for one or more service providers (SP) that operate Wi-Fi networks in a subscription data object of the mobile device, the subscription information including home service provider information, policy information, and pre-provisioned credentials, wherein the policy information includes a service provider blacklist that indicates hotspot providers with which the home service provider does not have a roaming agreement wherein the service provider blacklist identifies a fully-qualified domain name (FQDN) for each blacklisted hotspot service provider;

determining, without user interaction, if the subscription information is applicable to an available Wi-Fi network;

when the subscription information is applicable to an available Wi-Fi network, the method includes performing, without user interaction, an extensible authentication protocol (EAP) based authentication using the pre-provisioned credentials with the available Wi-Fi network to establish a Wi-Fi connection with the available Wi-Fi network; and refraining from establishing a Wi-Fi connection with hotspot service providers identified in the service provider blacklist.

2. The method of claim 1 wherein the home service provider information identifies a home service provider, the home service provider being a service provider that the mobile device has a subscription agreement with, and
wherein determining comprises:
determining, based on the home service provider information and the policy information, whether the mobile device has a subscription agreement with a service provider of an available Wi-Fi network, or
determining whether the home service provider has a roaming agreement with the available Wi-Fi network.

3. The method of claim 2 wherein the home service provider information identifies a friendly name, a fully-qualified domain name (FQDN) and a service provider network access identifier (NAI) realm for the home service provider.

4. The method of claim 2 wherein the Wi-Fi hotspot is a Wi-Fi Hotspot 2.0 operating in accordance with a Hotspot 2.0 specification,
wherein the mobile device is a Hotspot 2.0 enabled device, and
wherein the subscription information comprises pre-provisioned subscription information for automatic connection to the Hotspot 2.0.

5. The method of claim 2 wherein the policy information includes a roaming partner list indicating the hotspot service providers that the home service provider has a roaming agreement with.

6. The method of claim 5 further comprising performing roaming from a currently connected Wi-Fi network to a base station of a cellular network using pre-provisioned credentials for the cellular network.

7. The method of claim 5 wherein the pre-provisioned credentials are unified credentials and comprise a digital certificate for EAP-TLS (transport-layer security) authentication.

8. The method of claim 7 wherein the mobile device is a single-mode device with Wi-Fi network capability but without cellular-network capability, and
wherein the digital certificate is an X.509 configured certificate that is based on public/private key pair.

9. The method of claim 5 wherein the mobile device is a dual-mode device having both Wi-Fi network capability and cellular-network capability, and
wherein the pre-provisioned credentials comprise a subscriber-identity module (SIM) for either an EAP-AKA (Authentication and Key Agreement) or an EAP-SIM (Subscriber Identity Module) authentication.

10. The method of claim 5 wherein the pre-provisioned credentials comprise a user name and password, for use with server-side certificates, for either EAP-Tunneled Transport Layer Security (EAP-TTLS) or EAP-Flexible Authentication via Secure Tunneling (EAP-FAST) authentication.

11. The method of claim 5 wherein for each hotspot service provider on the roaming partner list, the subscription data object includes a fully-qualified domain name (FQDN) and priority information.

12. The method of claim 5 wherein the policy information further includes policy parameters that indicate one or more of locations, dates and times for which certain of the subscription information is valid.

13. The method of claim 2 further comprising:
discovering and selecting available Wi-Fi networks at a current location of the mobile device;
determining if the mobile device is pre-provisioned for automatic connectivity for any one or more of the available Wi-Fi networks based on the subscription information; and
when the mobile device is pre-provisioned for connectivity to more than one of the available Wi-Fi networks, the method includes selecting a preferred of the available Wi-Fi networks based on priority information in the subscription data object.

14. The method of claim 13 when the mobile device is not pre-provisioned for any of the available Wi-Fi networks, the method includes:
performing a subscription provisioning process to generate pre-provisioned subscription information; and
storing the pre-provisioned subscription information in the subscription data object.

15. The method of claim 14 wherein the subscription information is stored in the mobile device by downloading the subscription information in accordance with either an open-mobile alliance (OMA) device management (DM) (OMA-DM) technique or a Simple Object Access Protocol (SOAP) Extensible Markup Language (XML) (SOAP-XML) technique.

16. The method of claim 14 wherein performing the subscription provisioning process includes connecting to a sign-up server and signing up for a subscription agreement with a Wi-Fi network service provider.

17. The method of claim 13 wherein identifying available Wi-Fi networks at the current location comprises:
determining the current location of the mobile device based on a geo-location, a cellular identifier or a WLAN identifier;
retrieving, without user interaction, a list of one or more preferred Wi-Fi networks available at the current location from the subscription data object; and
automatically performing, without user interaction, the EAP based authentication using the pre-provisioned credentials with a selected one of the available Wi-Fi networks to establish the Wi-Fi connection.

18. The method of claim 1 further comprising roaming from a currently connected Wi-Fi network to a hotspot of another Wi-Fi network operated by either the home service provider or a hotspot service provider on the roaming partner list; and
refraining from roaming to a hotspot operated by a service provider on the service provider blacklist.

19. The method of claim 1, wherein the mobile device is a dual-mode mobile device for communicating with a Wi-Fi network and a cellular network, and
wherein the method further includes offloading traffic from a cellular network to the Wi-Fi network after the connection to the Wi-Fi network is established.

20. A mobile device configured for Wi-Fi hotspot automatic connectivity comprising:
memory to store subscription information for one or more service providers (SP) that operate Wi-Fi networks in a subscription data object, the subscription information including home service provider information, policy information, pre-provisioned credentials, and a service provider blacklist that indicates hotspot providers with which the home service provider does not have a roaming agreement wherein the service provider blacklist identifies a fully-qualified domain name (FQDN) for each blacklisted hotspot service provider;

processing circuitry configured to determine without user interaction, if the subscription information is applicable to an available Wi-Fi network, wherein when the subscription information is applicable to an available Wi-Fi network, the processing circuitry is configured to perform without user interaction, an extensible authentication protocol (EAP) based authentication using the pre-provisioned credentials with the available Wi-Fi network to establish a Wi-Fi connection with the available Wi-Fi network; and wherein the processing circuitry is further configured to refrain from establishing a Wi-Fi connection with hotspot service providers identified in the service provider blacklist.

21. The mobile device of claim 20 wherein the home service provider information identifies a home service provider, the home service provider being a service provider that the mobile device has a subscription agreement with, and wherein the processing circuitry is configured to determine based on the home service provider information and the policy information, whether the mobile device has a subscription agreement with a service provider of an available Wi-Fi network, or whether the home service provider has a roaming agreement with the available Wi-Fi network, wherein the home service provider information identifies a friendly name, a fully-qualified domain name (FQDN) and a service provider network access identifier (NAI) realm for the home service provider, and wherein the policy information includes a roaming partner list indicating the hotspot service providers that the home service provider has a roaming agreement with.

22. The mobile device of claim 21 further configured to:

discover and select available Wi-Fi networks at a current location of the mobile device;

determine if the mobile device is pre-provisioned for automatic connectivity for any one or more of the available Wi-Fi networks based on the subscription information; and when the mobile device is pre-provisioned for connectivity to more than one of the available Wi-Fi networks, the select a preferred of the available Wi-Fi networks based on priority information in the subscription data object.

23. The mobile device of claim 22, wherein the mobile device is a dual-mode mobile device for communicating with a Wi-Fi network and a cellular network, and wherein the mobile device is further configured to offload traffic from a cellular network to the Wi-Fi network after the connection to the Wi-Fi network is established.

24. A method for automatic connectivity for Wi-Fi hotspots comprising:

pre-provisioning a mobile device with subscription information for one or more service providers (SP) that operate Wi-Fi networks, the subscription information including home service provider information, policy information, pre-provisioned credentials, a service provider blacklist indicating hotspot service providers with which the home service provider does not have a roaming agreement and, for each hotspot service provider on the roaming partner list, the subscription data object includes a fully-qualified domain name (FQDN) and priority information, the service provider blacklist further identifying the FQDN for each blacklisted hotspot service provider;

configuring the mobile device to determine, without user interaction, if the subscription information is applicable to an available Wi-Fi network;

configuring the mobile device to perform without user interaction, an extensible authentication protocol (EAP) based authentication using the pre-provisioned credentials with the available Wi-Fi network to establish a Wi-Fi connection with the available Wi-Fi network when the subscription information is applicable to an available Wi-Fi network; and refraining from establishing a Wi-Fi connection with a hotspot service provider identified in the service provider blacklist.

25. The method of claim 24 wherein the home service provider information identifies a friendly name, a fully-qualified domain name (FQDN) and a service provider network access identifier (NAI) realm for the home service provider, and wherein the policy information includes a roaming partner list indicating the hotspot service providers that the home service provider has a roaming agreement with.

\* \* \* \* \*